W. F. ARNDT.
PRESSURE SIGNALING DEVICE FOR TIRES.
APPLICATION FILED JUNE 17, 1921.
1,422,068.          Patented July 11, 1922.
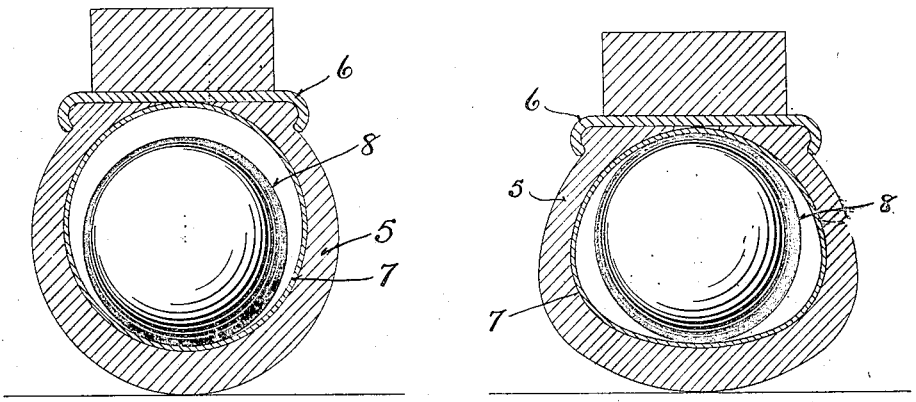
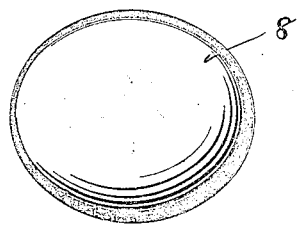

UNITED STATES PATENT OFFICE.

WILLIAM F. ARNDT, OF WATERTOWN, WISCONSIN

PRESSURE-SIGNALING DEVICE FOR TIRES.

1,422,068.    Specification of Letters Patent.    Patented July 11, 1922.

Application filed June 17, 1921. Serial No. 478,437.

*To all whom it may concern:*

Be it known that I, WILLIAM F. ARNDT, a citizen of the United States, and resident of Watertown, in the county of Jefferson and State of Wisconsin, have invented certain new and useful Improvements in Pressure-Signaling Devices for Tires; and I do hereby declare that the following is a full, clear, and exact description thereof.

My invention relates to a new and useful improvement in a pressure signaling device for pneumatic tires.

The usual automobile driver does not watch his tires closely enough and as a result the automobile is frequently driven with the tires only partially inflated. A tire therefore frequently receives stone bruises and the fabric of same, as well as the inner tube, will receive rim cuts and be otherwise weakened in texture and strength. For this reason the tire-maker cannot guarantee as much mileage as he might if he was sure that the tire would always be properly inflated. It also frequently happens that a puncture resulting in a small leak is incurred on a trip and even the most careful driver will not notice that the tire is leaking until it becomes badly injured.

It is the object of my invention to construct a tire which shall have means for giving an unmistakable signal to the driver so that he will know at once when the tire is unsufficiently inflated.

The means for accomplishing this object will be apparent from the accompanying drawing in which:

Figure 1 is a cross sectional view of a tire equipped according to my invention.

Figure is a smaller view of the tire under the normal load when in operation.

Figure 3 is a side elevation of a ball which is inserted in the inner tube to carry out my invention.

Referring specifically to the structure shown in the drawing the numeral 5 indicates the outer casing of the tire as mounted on the rim 6. The numeral 7 indicates the inner tube in which is enclosed a ball 8. This ball is elongated in shape and its smallest diameter is small enough to permit the ball to ride freely in the inner tube when under a normal load if the tire is properly inflated. When the tire becomes partially deflated the ball will be caught between the sides of the inner tube and will cause a bulge therein so that as the wheel revolves there will be a noticeable bump caused by the inside flat rim of the wheel riding over the ball where contact does not injure the tire or tube.

The ball 8 will be composed of solid rubber in the case of the smaller size tires but when used with larger tires it is preferable to form the ball with a core of wood or some substance which will be less yielding than rubber in order to offer more resistance to the weight of the heavier vehicle supported by the tire.

The ball is elongated in shape so that it will not ride too freely within the tire and when the vehicle is traveling the centrifugal force will carry the center of gravity of the ball as near as possible to the outer side of the tire. Since the radius of curvature of the elongated elements of the surface of the ball is greater than that of the iner circumference of the tube, the ball will take up a position with its major diameter disposed lengthwise of the tube and will be carried around therewith, and if the tire becomes partially deflated a regular periodic bump will occur at every revolution of the wheel; thus the driver will be at once advised of the condition of his tire and the fact that it needs more air or that he has a puncture which must be repaired. With a tire equipped with this device therefore the driver will always be able to keep his tires properly inflated and much tire trouble will be eliminated and the life of the tire will be prolonged to a maximum degree.

The advantage of the elongated ball over one of spherical shape will be apparent since with a spherical ball the centrifugal force will not be opposed to gravity acting on the ball and the latter will therefore roll freely in the rear portion of the tire and will not be carried around with it.

I claim as my invention:

1. The combination with the inner tube of a pneumatic tire, of an elongated solid ball enclosed thereby and composed chiefly of rubber, the longest dimension of the ball being not less than the normal diameter of the tube and the shortest diameter thereof being approximately three-quarters of the normal diameter of the tube.

2. The combination with the inner tube of a pneumatic tire, of an elongated solid ball enclosed thereby, the elongated elements of the surface of the ball having a greater radius of curvature than the inner circumference of the tube, and the shortest diameter of the ball being approximately three-fourths of the normal diameter of the tube.

In testimony that I claim the foregoing I have hereunto set my hand at Watertown, in the county of Jefferson and State of Wisconsin.

WILLIAM F. ARNDT.